United States Patent
Zuberi et al.

(10) Patent No.: US 7,640,732 B2
(45) Date of Patent: Jan. 5, 2010

(54) METHOD AND APPARATUS FOR FILTRATION OF A TWO-STROKE ENGINE EXHAUST

(75) Inventors: Bilal Zuberi, Cambridge, MA (US); Robert G. Lachenauer, Weston, MA (US)

(73) Assignee: GEO2 Technologies, Inc., Woburn, MA (US)

( * ) Notice: Subject to any disclaimer, the term of this patent is extended or adjusted under 35 U.S.C. 154(b) by 0 days.

(21) Appl. No.: 11/534,142

(22) Filed: Sep. 21, 2006

(65) Prior Publication Data

US 2007/0220871 A1 Sep. 27, 2007

Related U.S. Application Data

(63) Continuation-in-part of application No. 11/323,429, filed on Dec. 30, 2005, now abandoned.

(60) Provisional application No. 60/737,237, filed on Nov. 16, 2005.

(51) Int. Cl.
 *F01N 3/10* (2006.01)
(52) U.S. Cl. .............................. 60/299; 60/274; 60/295; 60/297; 60/311; 55/524; 55/527; 55/DIG. 30
(58) Field of Classification Search ................ 60/274, 60/278, 289, 295, 297, 299, 311; 55/523, 55/524, 527, DIG. 30
 See application file for complete search history.

(56) References Cited

U.S. PATENT DOCUMENTS

| | | | |
|---|---|---|---|
| 1,335,466 A | 3/1920 | Stevenson | |
| 1,533,813 A | 4/1925 | Schroeder | |
| 1,993,821 A | 3/1935 | Benner et al. | |
| 2,752,001 A | 6/1956 | Muller | |
| 3,819,334 A | 6/1974 | Yoshida et al. | |
| 3,899,555 A | 8/1975 | Takeo et al. | |
| 3,912,658 A | 10/1975 | Kaneko et al. | |
| 3,961,907 A | 6/1976 | Close et al. | |
| 4,047,965 A | 9/1977 | Karst et al. | |
| 4,053,011 A | 10/1977 | Riewald et al. | |
| 4,071,594 A | 1/1978 | Pearson et al. | |
| 4,329,162 A | 5/1982 | Pitcher, Jr. | |
| 4,409,284 A | 10/1983 | Sugino et al. | |

(Continued)

FOREIGN PATENT DOCUMENTS

CN 1349839 5/2002

(Continued)

OTHER PUBLICATIONS

"Fiber-reinforced SiC", *Jpn. Technol. Highlights,* vol. 6, No. 4, ISSN: 1060-8117,(Feb. 22, 1995),15.

(Continued)

*Primary Examiner*—Binh Q Tran (57) ABSTRACT

A highly porous ceramic filter consisting essentially of bonded ceramic fibers forms a part of an exhaust filtration system for a gasoline two-stroke engine. The porosity of the substrate permits accumulation of particulate constituents of the exhaust stream without detracting from the engine performance due to backpressure. Embodiments of the porous ceramic filter are disposed with a catalyst to facilitate reduction of gaseous and particulate byproducts of combustion from the two-stroke engine, so that emission of harmful pollutants is minimized.

32 Claims, 10 Drawing Sheets

U.S. PATENT DOCUMENTS

| | | | |
|---|---|---|---|
| 4,416,676 A | 11/1983 | Montierth | |
| 4,417,908 A | 11/1983 | Pitcher, Jr. | |
| 4,419,108 A | 12/1983 | Frost et al. | |
| 4,420,316 A | 12/1983 | Frost et al. | |
| 4,448,833 A | 5/1984 | Yamaguchi et al. | |
| 4,608,361 A | 8/1986 | Kanamori et al. | |
| 4,652,286 A | 3/1987 | Kusuda et al. | |
| 4,761,323 A | 8/1988 | Muhlratzer et al. | |
| 4,810,458 A | 3/1989 | Oshima | |
| 4,824,711 A | 4/1989 | Cagliostro et al. | |
| 4,828,785 A | 5/1989 | Newkirk et al. | |
| 4,833,115 A | 5/1989 | Koschlig et al. | |
| 4,868,142 A | 9/1989 | Waisala | |
| 4,966,873 A | 10/1990 | Iida et al. | |
| 4,968,467 A | 11/1990 | Zievers | |
| 5,053,092 A | 10/1991 | Lachman | |
| 5,070,588 A | 12/1991 | Miwa et al. | |
| 5,075,160 A | 12/1991 | Stinton et al. | |
| 5,078,818 A | 1/1992 | Han et al. | |
| 5,098,455 A | 3/1992 | Doty et al. | |
| 5,123,243 A * | 6/1992 | Baddour | 60/274 |
| 5,126,431 A | 6/1992 | Nesheiwat | |
| 5,153,057 A | 10/1992 | Corbett | |
| 5,194,407 A | 3/1993 | Waisala et al. | |
| 5,194,414 A | 3/1993 | Kuma | |
| 5,196,120 A | 3/1993 | White | |
| 5,207,807 A | 5/1993 | Manfre et al. | |
| 5,249,948 A | 10/1993 | Koslow | |
| 5,251,564 A * | 10/1993 | Rim et al. | 110/344 |
| 5,260,035 A | 11/1993 | Lachman et al. | |
| 5,298,046 A | 3/1994 | Piesert | |
| 5,316,710 A | 5/1994 | Tasaki et al. | |
| 5,322,537 A | 6/1994 | Nakamura et al. | |
| 5,335,712 A | 8/1994 | Corbett et al. | |
| 5,338,253 A | 8/1994 | Damsohn et al. | |
| 5,348,987 A | 9/1994 | Kato et al. | |
| 5,376,341 A * | 12/1994 | Gulati | 422/179 |
| 5,488,017 A | 1/1996 | Szweda et al. | |
| 5,492,580 A | 2/1996 | Frank | |
| 5,518,678 A | 5/1996 | Miyamoto et al. | |
| 5,518,833 A | 5/1996 | Repplinger et al. | |
| 5,545,297 A | 8/1996 | Andersen et al. | |
| 5,549,859 A | 8/1996 | Andersen et al. | |
| 5,611,831 A | 3/1997 | Matsuoka et al. | |
| 5,622,041 A | 4/1997 | Feeley et al. | |
| 5,623,013 A | 4/1997 | Tanaka et al. | |
| 5,629,067 A | 5/1997 | Kotani et al. | |
| 5,662,731 A | 9/1997 | Andersen et al. | |
| 5,681,373 A | 10/1997 | Taylor et al. | |
| 5,707,584 A | 1/1998 | Terpstra et al. | |
| 5,714,226 A | 2/1998 | Disselbeck | |
| 5,820,833 A | 10/1998 | Kawamura | |
| 5,851,326 A | 12/1998 | Custer et al. | |
| 5,853,439 A | 12/1998 | Gieseke et al. | |
| 5,900,207 A | 5/1999 | Danforth et al. | |
| 5,914,187 A | 6/1999 | Naruse et al. | |
| 5,948,257 A | 9/1999 | Custer et al. | |
| 6,040,266 A * | 3/2000 | Fay et al. | 502/439 |
| 6,057,030 A | 5/2000 | Mano | |
| 6,117,518 A | 9/2000 | Cawse et al. | |
| 6,155,432 A | 12/2000 | Wilson et al. | |
| 6,179,460 B1 | 1/2001 | Burkhardt et al. | |
| 6,194,066 B1 | 2/2001 | Hoffman | |
| 6,228,293 B1 | 5/2001 | Kriegsmann et al. | |
| 6,238,618 B1 | 5/2001 | Brundage et al. | |
| 6,261,510 B1 | 7/2001 | Terpstra et al. | |
| 6,321,915 B1 | 11/2001 | Wilson et al. | |
| 6,365,092 B1 | 4/2002 | Backa | |
| 6,375,450 B1 | 4/2002 | Golomb et al. | |
| 6,379,446 B1 | 4/2002 | Andersen et al. | |
| 6,423,537 B1 | 7/2002 | Soria et al. | |
| 6,444,006 B1 | 9/2002 | Haberkamp et al. | |
| 6,471,394 B2 | 10/2002 | Kesig | |
| 6,506,336 B1 | 1/2003 | Beall et al. | |
| 6,547,967 B1 | 4/2003 | Adler et al. | |
| 6,582,490 B2 | 6/2003 | Miller et al. | |
| 6,613,384 B1 | 9/2003 | Waller | |
| 6,651,773 B1 * | 11/2003 | Marocco | 181/270 |
| 6,669,751 B1 * | 12/2003 | Ohno et al. | 55/523 |
| 6,716,376 B1 | 4/2004 | Haug et al. | |
| 6,860,917 B2 | 3/2005 | Henrichsen et al. | |
| 6,881,361 B1 | 4/2005 | Schulze et al. | |
| 6,899,777 B2 | 5/2005 | Vaidyanathan et al. | |
| 6,935,461 B2 * | 8/2005 | Marocco | 181/270 |
| 6,946,013 B2 | 9/2005 | Alward et al. | |
| 6,991,672 B2 | 1/2006 | Marrecau | |
| 6,991,673 B2 | 1/2006 | Wastijn et al. | |
| 7,041,359 B2 | 5/2006 | Hijikata | |
| 7,052,532 B1 * | 5/2006 | Liu et al. | 96/154 |
| 7,052,760 B2 | 5/2006 | Hijikata | |
| 7,078,086 B2 | 7/2006 | Hijikata | |
| 7,083,842 B2 | 8/2006 | Masukawa et al. | |
| 7,090,715 B2 | 8/2006 | Chung et al. | |
| 7,112,050 B2 | 9/2006 | Bernas et al. | |
| 7,138,002 B2 | 11/2006 | Hamanaka et al. | |
| 7,138,003 B2 | 11/2006 | Ichikawa et al. | |
| 7,179,516 B2 | 2/2007 | Ichikawa | |
| 7,404,840 B2 * | 7/2008 | Wood et al. | 55/523 |
| 2001/0037972 A1 | 11/2001 | Quick et al. | |
| 2002/0014723 A1 | 2/2002 | Wallin et al. | |
| 2002/0157325 A1 | 10/2002 | Noda et al. | |
| 2003/0101701 A1 | 6/2003 | Henrichsen et al. | |
| 2003/0127393 A1 | 7/2003 | Tepper et al. | |
| 2003/0178357 A1 | 9/2003 | Wolff et al. | |
| 2004/0103627 A1 | 6/2004 | Dullien et al. | |
| 2004/0139734 A1 | 7/2004 | Schmeichel et al. | |
| 2004/0194505 A1 | 10/2004 | Wang et al. | |
| 2004/0231307 A1 | 11/2004 | Wood et al. | |
| 2005/0040003 A1 | 2/2005 | Kienzle et al. | |
| 2005/0042151 A1 | 2/2005 | Alward et al. | |
| 2005/0049362 A1 | 3/2005 | Buckley et al. | |
| 2005/0069469 A1 | 3/2005 | Fu et al. | |
| 2005/0074374 A1 | 4/2005 | Ogura | |
| 2005/0102987 A1 | 5/2005 | Kudo | |
| 2005/0109023 A1 | 5/2005 | Kudo et al. | |
| 2005/0126140 A1 | 6/2005 | Ito et al. | |
| 2005/0181193 A1 | 8/2005 | Lenke et al. | |
| 2005/0217228 A1 | 10/2005 | Beall et al. | |
| 2005/0230029 A1 | 10/2005 | Vaidyanathan et al. | |
| 2005/0271920 A1 | 12/2005 | Eshraghi et al. | |
| 2006/0075731 A1 | 4/2006 | Ohno et al. | |
| 2006/0154057 A1 | 7/2006 | Nonninger | |
| 2007/0032370 A1 | 2/2007 | Weisensel et al. | |
| 2007/0044443 A1 | 3/2007 | Nixdorf et al. | |
| 2007/0108647 A1 | 5/2007 | Zuberi et al. | |
| 2007/0111878 A1 | 5/2007 | Zuberi et al. | |
| 2007/0141255 A1 | 6/2007 | Zuberi | |
| 2007/0261557 A1 | 11/2007 | Gadkaree et al. | |

FOREIGN PATENT DOCUMENTS

| | | |
|---|---|---|
| EP | 0552715 | 7/1993 |
| EP | 0635298 | 1/1995 |
| EP | 0728521 | 8/1996 |
| EP | 00776696 | 6/1997 |
| EP | 01338326 | 8/2003 |
| EP | 01440722 | 7/2004 |
| EP | 01541216 | 6/2005 |
| GB | 2176179 | 12/1986 |
| JP | 61230747 | 10/1986 |
| JP | 63242980 | 10/1988 |
| JP | 03258347 | 11/1991 |
| JP | 06031177 | 2/1994 |
| JP | 07000757 | 1/1995 |

| | | |
|---|---|---|
| JP | 2001-252529 | 9/2001 |
| KR | 2001016633 | 3/2001 |
| WO | WO-97/12410 | 4/1997 |
| WO | WO-97/12844 | 4/1997 |
| WO | WO-2006070540 | 7/2006 |

OTHER PUBLICATIONS

"Porosity reduces CMC properties", *Adv. Compos. Bull.*, ISSN: 0951-953X,(Feg. 1995),2-3.

"Rapid preforming developed for metal matrix composites", *High-Performance Composites,* vol. 9, No. 1, ISSN: 1081-9223,(Jan.-Feb. 2001),60.

Gulati, Suresh T., "Physical Durability of Thin Wall Ceramic Substrates", *SAE Technical Paper Series 982635,* (Oct. 1998).

"Diesel Filter Materials", *DieselNet Technology Guide,* www.DieselNet.com,(Jan. 2003).

"Wall-Flow Monoliths", *DieselNet Technology Guide,* www.DieselNet.com,(Sep. 2005).

"Ceramic Catalyst Substrates", *DieselNet Technology Guide,* www.DieselNet.com,(Apr. 1997).

"Ceramic Fibers and Cartidges", *DieselNet Technology Guide,* www.DieselNet.com,(Jul. 2001).

Cooke, Theodore F., "Inorganic Fibers—A Literature Review", *J. Am. Ceram. Soc.,* 74(12), (1991),2959-2978.

Miller, Robert K., et al., "Design, Development and Performance of a Composite Diesel Particulate Filter", *SAE Technical Paper Series,* 2002-01-0323,(Mar. 2002).

Li, Cheng G., et al., "Properties and Performance of Diesel Particulate Filters of an Advanced Ceramic Material", *SAE Technical Paper Series,* 2004-01-0955,(Mar. 2004).

Blackburn, Stuart et al., "Mullite-Alumina Composites by Extrusion", *J. Am. Ceram. Soc.* 75[4], (1992),953-957.

* cited by examiner

TABLE 1 – Fiber Compositions

FIBER COMPOSITIONS

Mullite
Alumina
Silica
Blends of alumina and silica
Blends of alumina
Silica and aluminosilicate
Aluminaborosilicate
Silicon carbide
Silicon nitride,
Cordierite
Nextel 312, 440, 550, 610, 650, 720,
YAG (yttrium aluminum garnet) fibers and the
AETB compositions
Alumina-mullite
Alumina-silica-zirconia
Alumina-silica-chromia
Magnesium-silicate
Magnesium strontium silicate
Magnesium calcium strontium silicate
Fiber-glass
E-glass
Cordierite fiber
Aluminum titanate fiber
Strontium titanium oxide
Titania fiber
Titanium carbide fiber
Calciumaluminasilicate
Nextel fibers
Almax fibers
Fibrox fibers
Polyster fibers
Aramid fibers
Carbon fibers
Hoskins
Inconel
Hastelloy
Yittrium nickel garnett
FeCrAl alloys

FIBER COMPOSITIONS (CONT)

Phenolic fibers
Polymeric fibers
Cellulose
Keratin
Kevlar
Nylon
PTFE
Teflon
Kynol
Mylar
Zircon fibers
Nickel
Copper
Brass
Stainless Steel
Nickel Chromium
Ni3Al

WHISKERS

Al2O3
MgO
MgO-Al2O3
Fe2O3
BeO
MoO
NiO
Cr2O3
ZnO
Si3N4
AlN
ZnS
CdS
Tungsten Oxide
LaB6
CrB
SiC
B4C

FIG. 11

TABLE 1 - - FIBER SELECTION (CONT)

FIBER STATES

Amorphous
Glass
Glass-Ceramic
Polycrystalline
Mono-crystalline (whisker)
Whisker-like

SPECIFIC DATA ON SELECTED FIBERS

| Trade Name | Manufacturer | Composition (wt%) |
|---|---|---|
| Fiber FP | DuPont | >99% a-$Al_2O_3$ |
| PRD-166 | DuPont | ~80% a-$Al_2O_3$ ~20% $ZrO_2$ |
| Nextel 312 | 3M | 62% $Al_2O_3$ 24% $SiO_2$ 14% $B_2O_3$ |
| Nextel 720 | 3M | 85% $Al_2O_3$ 15% $SiO_2$ |
| Nextel 550 | 3M | 73% $Al_2O_3$ 27% $SiO_2$ |
| Nextel 610 | 3M | 0.2–0.3% $SiO_2$ 0.4–0.7% $Fe_2O_3$ > 99% a-$Al_2O_3$ |
| Almax | Mitsui Mining | > 99% a-$Al_2O_3$ |
| Altex | Sumitomo | 85% ?-$Al_2O_3$ 15% $SiO_2$ |
| Saphikon | Saphikon | 100% $Al_2O_3$ |
| Nicalon NL200 | | Si-C-O |
| Hi-Nicalon | | Si-C |
| Tyranno Lox M | | Si-C-O-Ti |
| Sylramic | | SiC, $TiB_2$ |
| Tonen | | Si-N-C |
| SCS-6 | | SiC |
| Nextel 610 | | $Al_2O_3$ |
| Nextel 720 | | $Al_2O_3$-$SiO_2$ |
| Almax | | $Al_2O_3$ |
| Saphikon | | $Al_2O_3$ (single crystal) |

Note: Nextel 312 has a composition (by weight) of 62% alumina, 24% silica and 14% boria; Nextel 440 has a composition of 70% alumina, 28% silica and 2% boria; Nextel 550 is 73% alumina and 27% silica; Nextel 610 is >99% alumina; and Nextel 720 is 85% alumina and 15% silica. AETB is an acronym for alumina-enhanced thermal barrier, and AETB materials include alumina-silica-boria compounds, and combinations of alumina, silica, boria, and/or aluminoborosilicates.

FIG. 11
(CONTINUED)

Table 2 - - Binder Selection

ORGANIC BINDERS

Thermo Plastic Resins
polyethylene
polypropylene
polybutene
polystyrene
poly vinyl acetate
polyester
Isotactic polypropylen
atactic polypropylene
polysulphone
polyacetal polymers
polymethyl methacrylate
fumaron-indane copolymer
ethylene vinyl acetate copolymer
styrene-butadiene copolymer
acryl rubber
polyvinyl butyral
inomer resin Thermosetting Binders
Epoxy resin
nylon
phenol formaldehide
phenol furfural Waxes
paraffin wax
wax emulsions
microcrystalline wax Others
Celluloses
dextrines
chlorinated hydrocarbons
refined alginates
starches
gelatins
lignins
rubbers
acrylics
bitumens
casein
gums
albumins
proteins
glycols

INORGANIC BINDERS
fused silica
fumed silica
alumina
aluminaosilicate
aluminaborosilicate
soluble silicates
soluble aluminates
soluble phosphates
ball clay
kaolin
bentonite
colloidal silica
colloidal alumina
borophosphates

WATER SOLUABLE BINDERS
Hydroxypropyl methyl cellulose
hydroxyethyl cellulose
methyl cellulose
sodium carboxymethyl cellulose
polyvinyl alcohol
polyvinyl pyrrolidone
polyethylene oxide
polyacrylamides
polyethyterimine
agar
agarose
molasses
dextrines
starch
lignosulfonates
lignin liquor
sodium alginate
gum arabic
xanthan gum
gum tragacanth
gum karaya
locust bean gum
irish moss
scleroglucan
acrylics
cationic galactomanan

PLASTICIZERS
Stearic acid
polyethylene glycol
polypropylene glycol
propylene glycol
ethylene glycol
diethylene glycol
triethylene glycol
tetraethylene glycol
dimethyl phthalate
dibutyl phthalate
diethyl phthalate
dioctyl phthalate
diallyl phthalate
glycerol
oleic acid
butyl stearate
microcrystalline wax
paraffin wax
japan wax
carnauba wax
bees wax
ester wax
vegetable oil
fish oil
silicon oil
hydrogenated peanut oil
tritolyl phosphate
clycerol monostearate
organo silane
water

FIG. 11
(CONTINUED)

TABLE 3 - - PORE FORMER SELECTION carbon black
activated carbon
graphite flakes
synthetic graphite
wood flour
modified starch
starch
celluloses
coconut shell flour
husks
latex spheres
bird seeds
saw dust
pyrolyzable polymers
    poly (alkyl methacrylate)
        polymethyl methacrylate
        polyethyl methacrylate
        poly n-butyl methacrylate
    polyethers
        poly tetrahydrofuran
        poly (1,3-dioxolane)
    poly (alkalene oxides)
        polyethylene oxide
        polypropylene oxide pyrolyzable polymers (cont)
    methacrylate copolymers
    polyisobutylene
    polytrimethylene carbonate
    poly ethylene oxalate
    poly beta-propiolactone
    poly delta-valerolactone
    polyethylene carbonate
    polypropylene carbonate
    vinyl toluene/alpha-methyl styrene copolymer
    styrene/alpha-methyl styrene copolymers
    olefin-sulfur dioxide copolymers <u>synthetic graphite</u>
<u>petroleum coke</u>

TABLE 4 - - FLUID SELECTION

Water
Melted Binder (see Table 2)
Organic solvents

FIG. 11
(CONTINUED)

TABLE 5 - - RHEOLOGY CHART

FIG. 11
(CONTINUED)

METHOD AND APPARATUS FOR FILTRATION OF A TWO-STROKE ENGINE EXHAUST

CROSS-REFERENCE TO RELATED APPLICATIONS

This application is a continuation-in-part of U.S. patent application Ser. No. 11/323,429, filed Dec. 30, 2005 now abandoned entitled "An Extruded porous Substrate and Products using the Same" that claims the benefit of priority to U.S. Provisional Patent Application No. 60/737,237 filed Nov. 16, 2005, entitled "System for Extruding a Porous Substrate"; both of which are incorporated by reference herein in their entirety.

BACKGROUND OF THE INVENTION

This invention relates generally to a filter for the exhaust of a two-stroke gasoline engine, and more particularly, to a porous ceramic filter in such an exhaust.

Two-stroke engines are popular power generation sources for certain applications, including personal transportation vehicles, such as motorcycles, scooters, and mopeds, small boats, and gas-powered tools and implements, such as string trimmers, leaf blowers, and chainsaws. Two-stroke engines are specifically adaptable to these applications since they have a number of specific advantages over conventional four-stroke gasoline engines. Two-stroke engines have an increased specific power output, since there is a power stroke for each revolution, as opposed to one power stroke for every other revolution in a four-stroke engine. Two-stroke engines are inherently lighter and less complex, and thus cheaper to manufacture and operate, since they typically have no camshaft and associated valves. The high specific power and light weight contribute to an increased power-to-weight ratio over four-stroke engines. Further, two-stroke engines can operate in nearly any orientation, since lubrication of the moving parts is provided by a fuel and oil mixture, instead of an oil sump.

Two-stroke engines, however, are known as notorious contributors to air pollution, and for their noxious exhaust emissions. The increased levels of pollution arise from the combustion of oil lubricants that are mixed with the fuel, and due to the inefficiency of the incoming air, fuel, and oil charge that scavenge the exhaust from the combustion chamber. The down stroke of the piston in a two-stroke engine compresses the crankcase chamber driving the air/fuel charge into the combustion chamber, displacing the burned fuel byproducts. Some of the unburned fuel and oil mixes with the exhaust as it exits the chamber. Accordingly, increased levels of hydrocarbon particulate, compared to four-stroke engines result.

Exhaust filters and catalytic converters have been installed on two-stroke engines to reduce the degree to which this type of engine contributes to pollution, but the soot and particulate loading of conventional filters and catalytic converters results in decreased effectiveness of the catalyst, and reduced performance due to increased backpressure.

Accordingly, there is a need for an exhaust filter that can be applied to two-stroke engines to capture and reduce particulate emissions, without detracting from the performance and efficiency of these power sources.

BRIEF SUMMARY OF THE INVENTION

The present invention provides an exhaust filter that can be used effectively in a two-stroke engine exhaust system, using a porous ceramic filter consisting essentially of bonded ceramic fibers. The exhaust filtration system of the present invention captures the particulate matter found in the exhaust stream of a two-stroke engine, while permitting the exhaust gas to flow through the filter and exit the exhaust system. In an embodiment of the invention, the fibers of porous ceramic filter can be coated with a catalyst material that can accelerate the reduction of various constituents in the exhaust stream.

In a more specific example, the porous ceramic filter consisting essentially of bonded ceramic fibers is constructed in such a way that a plurality of channels are formed, separated by a wall of material that is the bonded ceramic fibers. In this embodiment, adjacent channels can be alternately plugged to implement a wall-flow configuration. This embodiment can be formed by extruding the porous ceramic material into a honeycomb substrate.

In another specific example, the porous ceramic filter consisting essentially of bonded ceramic fibers is an extruded honeycomb substrate having a porosity between 60% and 90% in a wall-flow configuration. A catalyst is disposed within the porous substrate, and the substrate is positioned within a filter housing. The filter housing receives an exhaust stream from a two-stroke engine, thereby outputting a filtered exhaust stream.

The catalyst disposed within the substrate according to the present invention operates to catalyze the reduction of particulate pollutants in the exhaust stream. Further, the catalyst disposed within the substrate operates to catalyze the reduction of gaseous pollutants in the exhaust stream.

Advantageously, the porous ceramic substrate consisting essentially of bonded ceramic fibers provides a highly porous filtration body that has a low thermal mass with high trapping efficiency. A catalyst coating on the fibers within the porous substrate catalyzes the conversion of gaseous constituents of byproducts of combustion into less-harmful gaseous products. Further, the accumulation of unburned hydrocarbons and particulate matter can be reduced through catalysis or accumulated within the porous cavities throughout the filter.

These and other features of the present invention will become apparent from a reading of the following descriptions, and may be realized by means of the instrumentalities and combinations particularly pointed out in the appended claims.

DETAILED DESCRIPTION OF THE INVENTION

Detailed descriptions of examples of the invention are provided herein. It is to be understood, however, that the present invention may be exemplified in various forms. Therefore, the specific details disclosed herein are not to be interpreted as limiting, but rather as a representative basis for teaching one skilled in the art how to employ the present invention in virtually any detailed system, structure, or manner.

Figure 1:
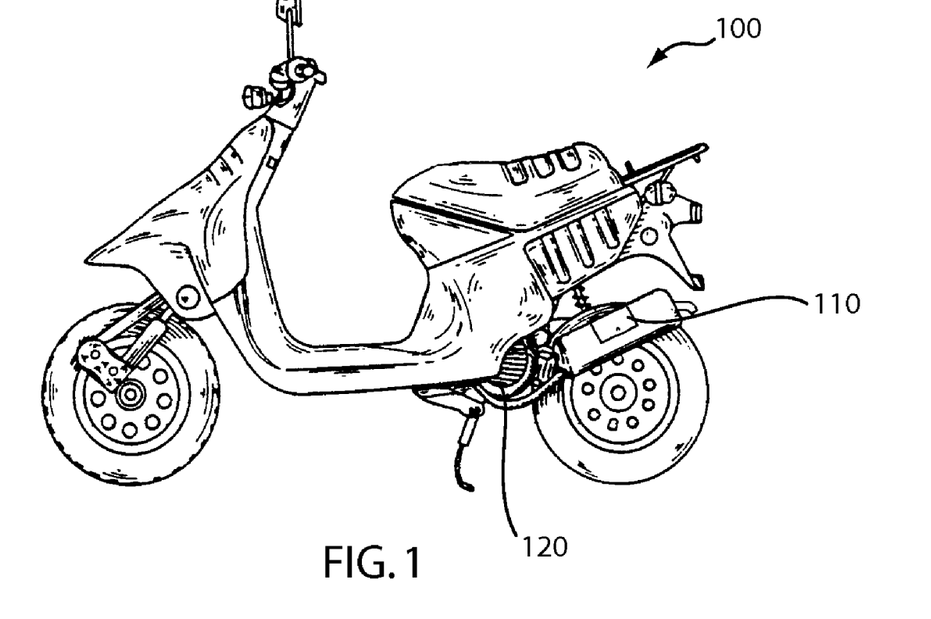
FIG. 1 shows a conventional two-stroke personal transportation vehicular device having an exhaust filtration system according to the present invention.
Figure 2:
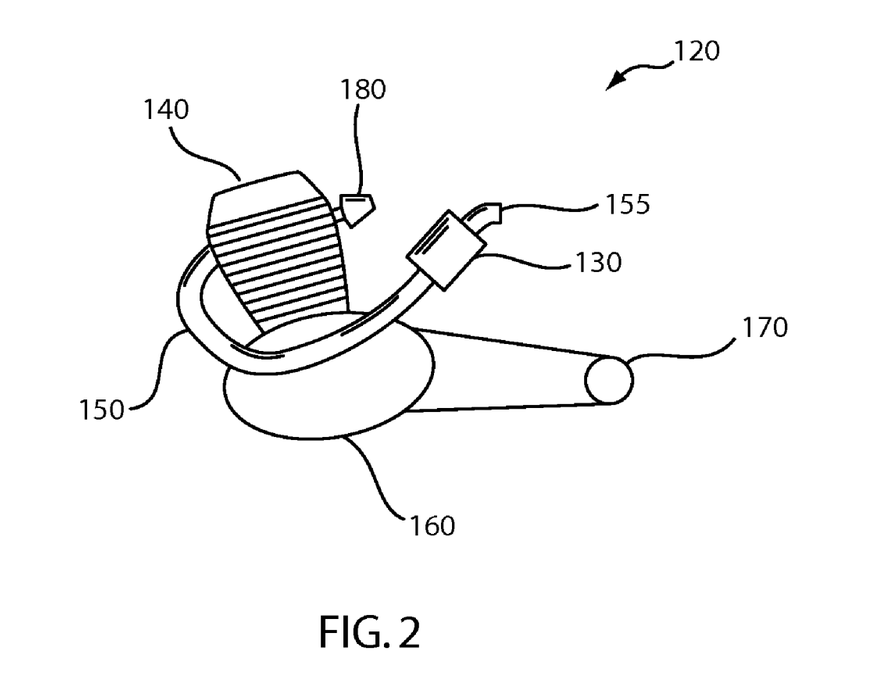
FIG. 2 shows a diagram of a two-stroke engine having an exhaust filtration system according to the present invention.

FIG. 1 depicts a typical personal transportation vehicular device conventionally powered by a two-stroke engine. Shown generally is a scooter 100 having a two-stroke engine 120 and an exhaust system 110 for expelling combustion byproducts in the form of an exhaust stream. The two-stroke engine 120, shown in more detail at FIG. 2, has at least one cylinder 140 and a crankcase 160 with a power output 170, depicted here as a chain drive mechanism. The two-stroke engine 120 has an exhaust outlet 150, shown here as an exhaust pipe, coupled to a filter housing 130. A filtered exhaust outlet 155 provides the outlet for the filtered exhaust stream emitted from the two-stroke engine 120. A fuel/air induction mechanism 180, most typically in the form of a conventional carburetor, is shown. Advanced two-stroke engines 120 are available with direct injection fuel injection for fuel/air induction, with associated sensors and controls. Direct injection fuel injection meters oil into the intake charge to provide lubrication of the engine components. After the exhaust port is effectively closed, and the intake charge has scavenged the exhaust from the chamber, the fuel is injected. In this way, the amount of unburned fuel expelled with the exhaust can be reduced.

Though depicted as a scooter 100 in FIG. 1, the present invention can be employed in nearly any application of a gasoline two-stroke power source. Motorcycles, mopeds, all-terrain vehicles, snowmobiles, and go-carts are other transportation vehicular devices that commonly use gasoline two-stroke engines that can utilize the exhaust filtration system of the present invention. Small boats using propulsion systems in the form of an outboard motor are commonly two-stroke gasoline engines. With small boats, not only is air pollution a common issue with land-based vehicular devices, but also, water pollution is equally a concern since unburned fuel and oil, and other particulate matter directly impacts the cleanliness of the surrounding water. In addition to personal transportation vehicular devices, gasoline two-stroke engines are commonly used in small gasoline powered tools and implements. For example, string trimmers, leaf blowers, chainsaws, generators, lawn mowers, and others, can utilize the exhaust filtration system of the present invention. Since the high power-to-weight ratio of two-stroke engines provides a distinct advantage to the use of these engines, the low mass of the exhaust filtration system of the present invention does not detract from the performance or ease of use of such tools.

Figure 3:
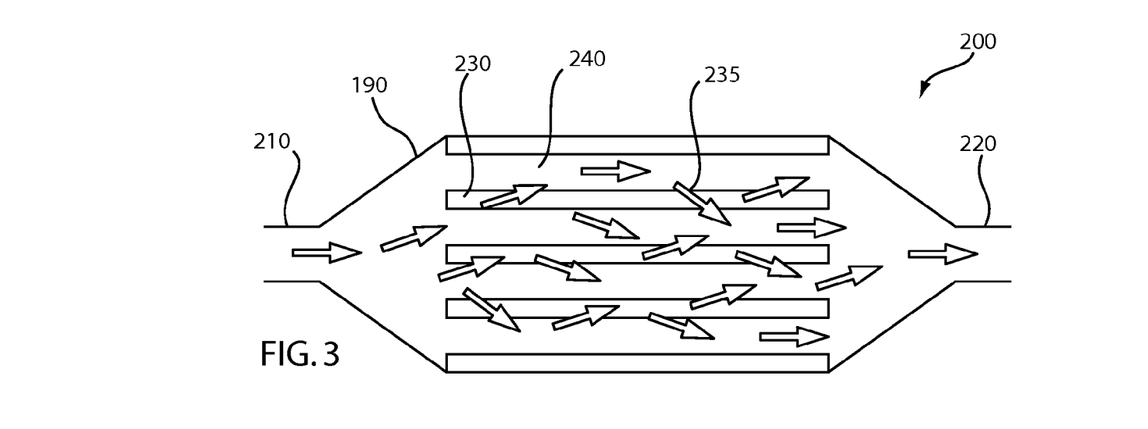
FIG. 3 depicts a diagram of a flow-through configuration of the present invention.

FIG. 3 depicts a cross-section of an exhaust filter 200 in a flow-through configuration. A porous ceramic filter 230, described further herein below, is positioned within a housing 190 having an inlet port 210 for receiving an exhaust stream and an outlet port 220 for venting cleaned exhaust gas. The filter 230 is constructed from a porous nonwoven fibrous ceramic body or block having a plurality of (typically parallel) channels formed therethrough, such as channel 240. The filter body is typically formed as a monolith, but may be formed from sections joined together, such as by cement, glue, or other convenient means. The channel 240 is typically parallel to adjacent channels and is typically formed in situ during the formation of the filter 230. For example, the body may be formed by extrusion with the channel 240 simultaneously extruded thereinto. Alternatively, the channel 240 may be cut, broached, cast, or otherwise formed via any convenient processes in the as-formed green or fired body 230.

Figure 4:
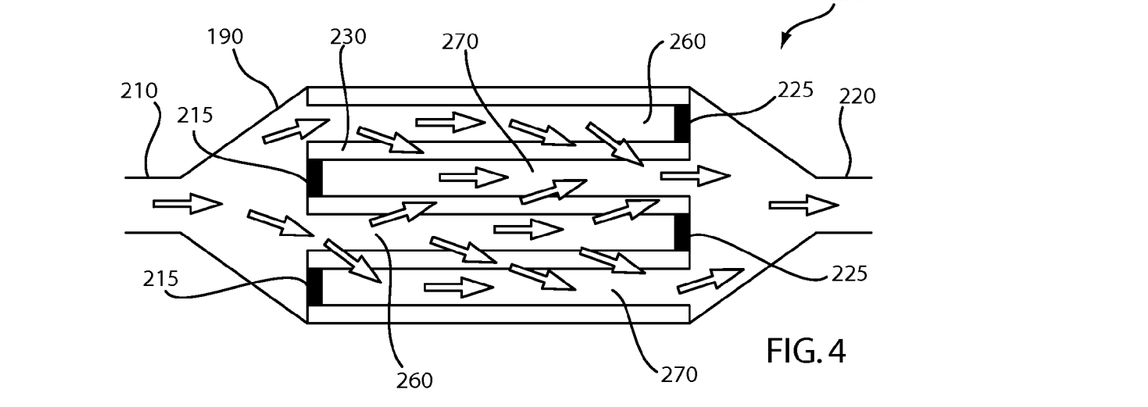
FIG. 4 depicts a diagram of a wall-flow configuration of the present invention.

FIG. 4 depicts a cross-section of an exhaust filter 250 in a wall-flow configuration. Similarly, the porous ceramic filter 230 is positioned within a housing 190 having an inlet port 210 for receiving an exhaust stream and an outlet port 220 for venting cleaned exhaust gas. Substantially gas-impermeable output channel blocks 215 are positioned in outlet channels 270, and substantially gas-impermeable input channel blocks 225 are positioned in inlet channels 260. Typically, the outlet blocks 215 and inlet blocks 225 are made of the same material as the rest of the filter body 230. More typically, the blocks 215 and 225 may be made of the same material as the rest of the body 230 but with less organic constituents in the unfired stage to yield substantially gas-impermeable properties. The outlet block 215 and the inlet block 225 prevent the direct flow of the exhaust stream completely through any filter, and thus, forcing the exhaust stream to flow through the porous ceramic body 230. In other words, by forcing the exhaust stream entering the filter housing 190 to flow into the inlet channel 260, and through the porous ceramic filter 230, and into the outlet channel 270, the filter 250 is limited to operate substantially according to the wall-flow configuration.

Figure 5:
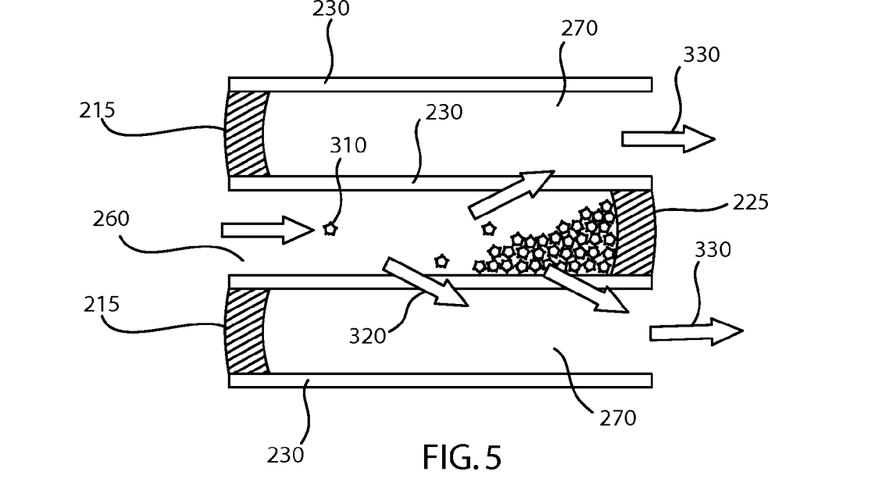
FIG. 5 shows a diagram of the accumulation of particulate matter from a two-stroke engine within a porous ceramic substrate according to the present invention.

FIG. 5 depicts a representation of the collection of particulate matter in the two-stroke application. Two-stroke engines inherently emit increased levels of particulate matter, due to the combustion of oil lubricants that are mixed with the fuel since combustion of the engine lubricating oil results in ash and particulates containing organic and inorganic solids. Further, increased levels of particulate matter with two-stroke engines are due to the inefficiency of the incoming air, fuel, and oil charge that scavenge the exhaust from the combustion chamber. The down stroke of the piston in a two-stroke engine compresses the crankcase chamber driving the air/fuel charge into the combustion chamber, displacing the burned fuel byproducts. Some of the unburned fuel and oil mixes with the exhaust as it exits the chamber. Accordingly, increased levels of hydrocarbon particulate, compared to four-stroke engines result.

Particulate matter and exhaust gases, collectively referred as combustion byproducts, diverted by the outlet channel blocks 215, enter an inlet channel 260. Particulate byproducts carried into the inlet channel 260 by the exhaust stream accumulate in the porous filter 230, including the inlet channel. Small particles, such as soot and droplets of unburned fuel and oil may penetrate into the pores of the porous filter, where they will also accumulate. Gaseous exhaust byproducts 320 pass through the porous filter body 230 into the outlet channel 270, directed as such by the inlet channel block 225. Filtered exhaust gas 330 exits the filter from the outlet channel 270.

Figure 6:
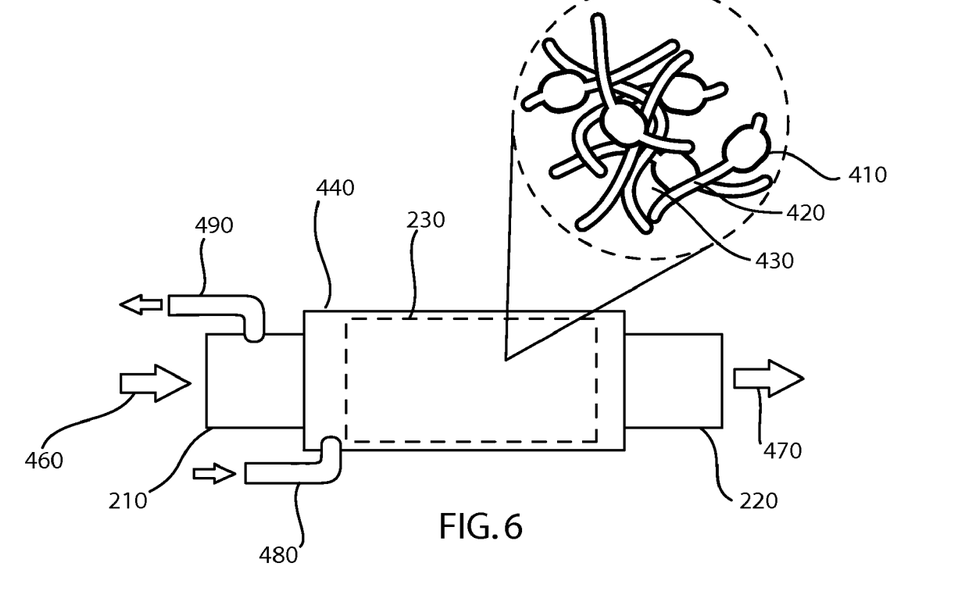
FIG. 6 depicts an embodiment of the present invention.

FIG. 6 depicts an exhaust filter for a two-stroke engine according to the present invention. An exhaust stream 460 from a two-stroke engine enters the inlet port 210 to pass through the porous filter 230 within a housing 440. In this embodiment, the porous filter 230 includes a reactive agent or catalyst material 410 disposed on the fibers 420 within the filter body 230. As shown, the fibers 420 form a structure that includes interconnected pores 430 that permit the flow of gaseous combustion byproducts, while accumulating particulate combustion byproducts, exposing both gaseous and particulate combustion byproducts to the catalyst 410 disposed within the filter. Filtered exhaust 470 exits the filter housing through the outlet port 200. Air injection port 480 permits the addition of oxygen necessary for the catalytic reduction of pollutants, which can be fed from an additional air intake or from an air pump driven by the two-stroke engine. Additionally, exhaust gas recirculation (EGR) port 490 permits the extraction of a relatively small amount of exhaust gas that is mixed with air intake at the engine, to control the rate of combustion in the combustion chamber to minimize the formation of pollutants.

Any number of catalysts and washcoats can be disposed within the porous ceramic filter 230 to chemically alter combustion byproducts in the exhaust stream by catalysis. Such a catalyst includes but is not limited to platinum, palladium (such as palladium oxide), rhodium, derivatives thereof including oxides, and mixtures thereof. In addition, the catalysts are not restricted to noble metals, combination of noble metals, or only to oxidation catalysts. Other suitable catalysts and washcoats include chromium, nickel, rhenium, ruthenium, silver, osmium, iridium, platinum, tungsten, barium, yttrium, neodymium, lanthanum, gadolinium, praseodymium, and gold, derivatives thereof, and mixtures thereof Other suitable catalysts include binary oxides of palladium, aluminum, tungsten, cerium, zirconium, and rare earth metals. Other suitable catalysts include vanadium and derivatives thereof, e.g., $V_2O_5$, or silver or copper vanadates, particularly when sulfur is present in the fuel or lubricant.

An advantage of the porous fibrous structure of the filter in the present invention is that the catalyst and washcoat is not only coated and dispersed on the surface of the walls of the channels in the filter, the catalyst and washcoat penetrate with uniform dispersion into the fibrous structure, where it is deposited on the ceramic fibers. Accordingly, when the filter 230 is operated in a wall-flow configuration, the exhaust stream has an improved exposure to the catalyst and washcoat materials, thereby improving the effectiveness of the catalyst, even with elevated levels of accumulated particulate matter.

Further advantages of the present invention include the ability to attenuate sound or noise from the exhaust of the two-stroke engine. The exhaust system of the present invention can be used without a conventional muffler, or using a much smaller muffler than otherwise necessary to meet safe or unobjectionable operating sound levels. Alternatively, the filter 230 can be integrated into a conventional muffler assembly to provide filtration of the exhaust of a two-stroke engine while contributing to the reduction of sound levels output from the engine. In an alternative embodiment, a second stage filter can be placed in the exhaust stream downstream from the filter 230 to capture any particles that may pass through the filter, for example, if lubricating oil mist coalesced within the filter 230 escapes in the exhaust stream exiting the filter.

Figure 7:
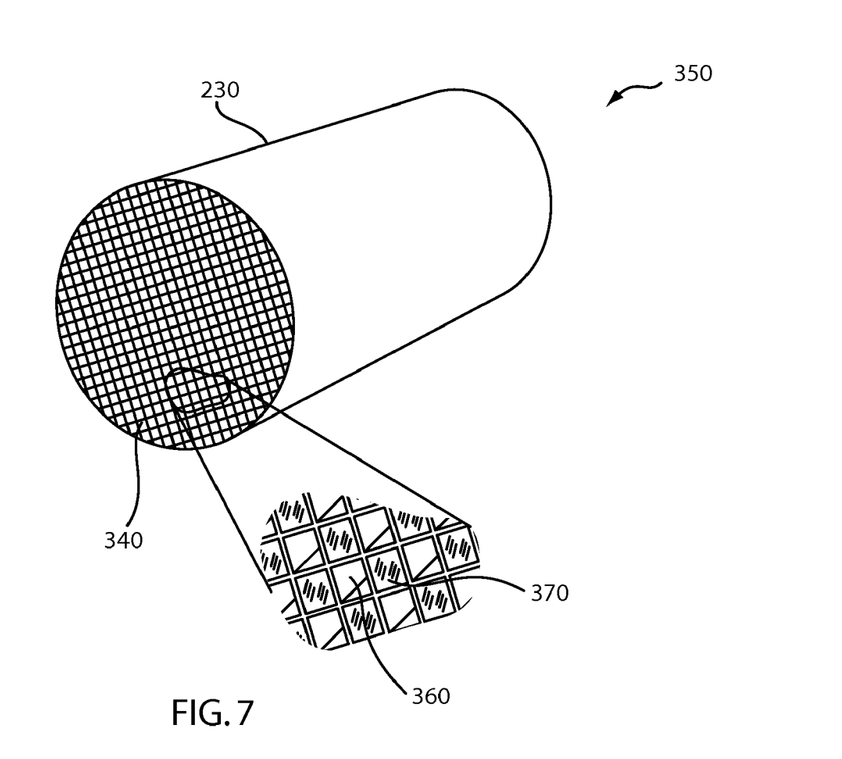
FIG. 7 depicts a honeycomb filter consisting essentially of bonded ceramic fibers in a wall-flow configuration.

FIG. 7 depicts an embodiment of the filter 230 used in the present invention. Shown is an extruded honeycomb filter 350 that consists of a plurality of parallel channels 340 extending fully through the axial length of the filter 230. The channels 340 are alternately plugged in a checkerboard pattern, so that channel 360 is open as shown, while plugged at the opposing end. Similarly, channel 370 is plugged as shown, while open at the opposing end. In operation, the exhaust stream is directed into channel 360, through the walls surrounding channel 360, partially into channel 370. Particulate combustion byproducts accumulate in channel 360, as well as within the body of the porous substrate 230. Catalyst material can be disposed on the interior surfaces of the channels 340 as well as disposed within the porous substrate 230, thereby reducing pollutants through catalysis. Extruded honeycomb filters can be made with a variety of cell densities. Higher cell densities provide increased surface area for filtration, while lower cell densities provide thicker walls for depth filtration and strength. A honeycomb ceramic filter having a cell density of 200 cells per inch has been shown to be effective, though cell densities between 50 and 400 cells per inch will provide effective filtration and strength.

Figure 8:
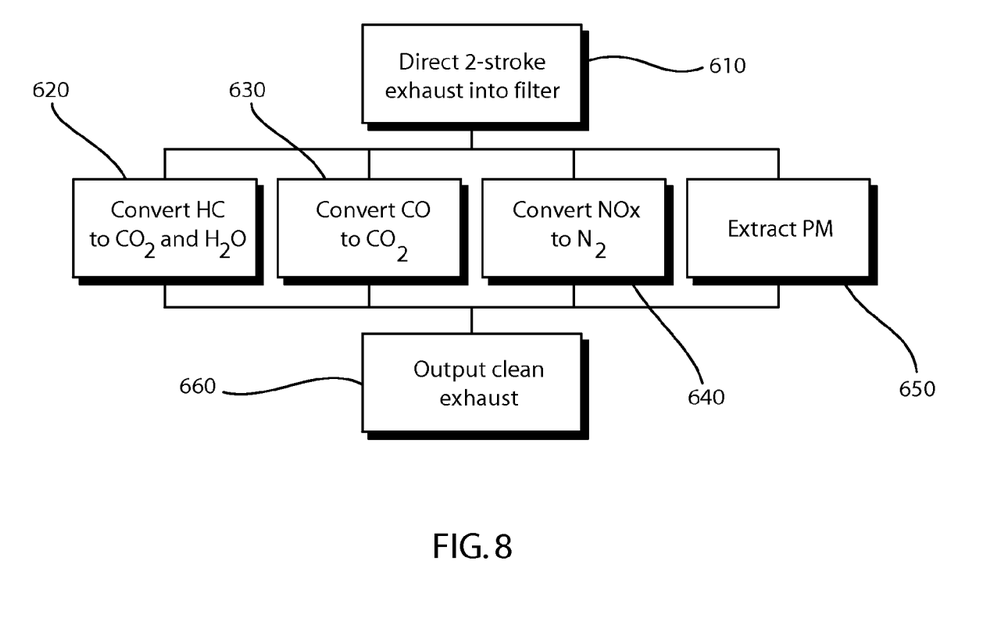
FIG. 8 shows a method for removing pollutants from the exhaust stream of a two-stroke engine.

FIG. 8 shows a flowchart of a method for filtering the exhaust of a two-stroke engine. Exhaust from a two-stroke engine is directed into a filter at step 610. This step can be accomplished, for example, by mounting a filter enclosed within a housing in the exhaust stream of a two-stroke engine. Depending on whether the filter is a wall flow configuration or a flow-through configuration, the exhaust stream will take a different path. It will also be appreciated that some filters may be constructed to enable both types of filtering. If the filter has a wall flow configuration then the exhaust stream is passed through a porous wall consisting essentially of ceramic fibers. If the filter is a flow-through configuration, then the exhaust stream is passed along a porous wall consisting essentially of ceramic fibers. The ceramic fibers that compose the porous filter 230 have catalyst material disposed thereon that accelerate the reduction of certain combustion byproducts, thereby reducing the pollutant levels of the exhaust.

At step 620, unburned hydrocarbon constituents, and available oxygen in the exhaust stream are converted to carbon dioxide and water. Hydrocarbon constituents in the exhaust stream can include unburned fuel and/or oil in a gaseous phase or liquid phase, or in a condensed form, commonly referred as soot. With the filter 230 coated with washcoat and catalyst, as described above, and the temperature of the exhaust stream greater than about 700 degrees Celsius, the filter will continuously regenerate through the conversion of hydrocarbons to carbon dioxide and water. At step 630, carbon monoxide, and available oxygen, can be converted to carbon dioxide. At step 640, which is optional in an embodiment of the invention, nitrous oxide constituents can be reduced to nitrogen gas and oxygen. At step 650, particulate constituents of the exhaust stream are extracted and trapped by the porous filter, particularly by the structure of the ceramic fibers, either by accumulating the particulate matter in the pores 430 of the intertangled ceramic fibers, or within the channels of the porous filter. Particulate constituents of the exhaust stream of a two-cycle engine can include inorganic materials, such as metal particles (for example, due to wear of the moving parts within the engine that are lubricated by the fuel/oil mixture prior to combustion), and additives in the fuel and oil mixture. At step 660, the clean, filtered exhaust gas is output from the filter.

Exhaust filters, and particularly, wall-flow particulate filters have not been successfully implemented with two-stroke engines prior to the invention hereof Two-stroke engines are extremely sensitive to backpressure, and a significant buildup of backpressure due to obstruction of the exhaust stream prevents the intake charge from scavenging the exhaust out of the combustion chamber, resulting in a drastic reduction in performance. The porous ceramic filter consisting essentially of bonded ceramic fibers has a porosity greater than 50%, providing space for accumulated particulates without obscuring the flow of the exhaust stream. By comparison, a porous ceramic filter composed on non-fibrous ceramic, i.e., conventional powder-based ceramic substrates, such as Cordierite, have been shown to provide effective filtration on a conventional two-stroke motor scooter for less than twenty miles without impacting the performance of the engine. A similar sized filter composed essentially of bonded ceramic fibers can be expected to last for hundreds of miles in a normal operating environment.

Figure 9:
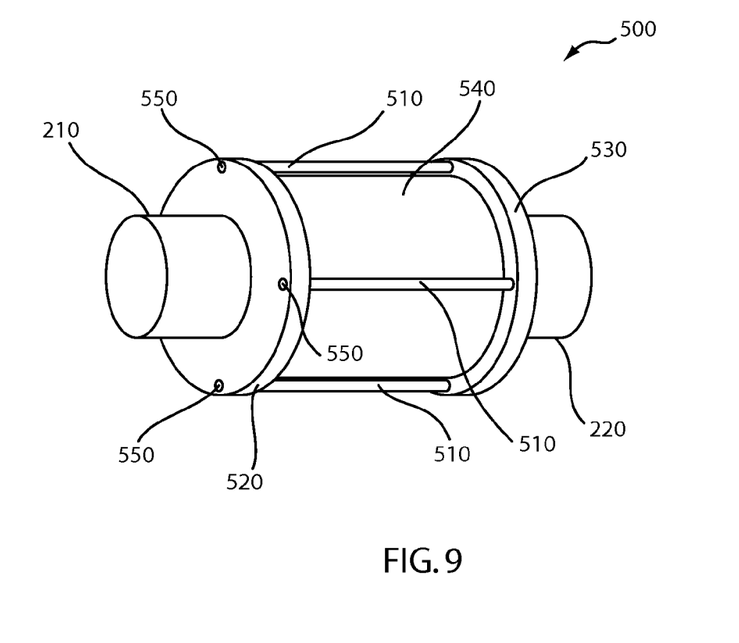
FIG. 9 depicts a replaceable filter housing according to the present invention.

In order to provide for maintenance and/or replacement of a filter with accumulated particulate matter that results in a reduction of performance, a replaceable filter housing 500 is depicted in FIG. 9. The exhaust stream from a two-stroke engine is directed into the inlet port 210, through the porous ceramic filter consisting essentially of bonded ceramic fibers (not shown) positioned within the filter can 540, where it is filtered and output the outlet port 220. A first flange 520 connected to the inlet port 210 is detachably coupled to the filter housing 540, cooperative with a second flange 530 connected to the outlet port 220, detachably coupled to the filter can 540. A plurality of connecting bolts 510 are inserted into the second flange, and threaded into threaded holes 550 of the first flange. The replaceable filter housing 500 permits access to the filter positioned therein by removal of the plurality of connecting bolts to remove the filter can 540. Once removed, accumulated particulate matter can be removed through the application of compressed air or liquid in a reverse flow, or through agitation. Further, the service procedure can be performed without removing the filter 230 from the housing, but rather by simply tapping the can 540 to dislodge the accumulated particulate matter. Ash particulates may be considered toxic, and may require special handling procedures. Alternatively, the filter can 540 with a porous ceramic filter positioned therein can be replaced with a new unit. A replacement unit can be provided as a canned unit, i.e., the porous filter 230 mounted in the filter can 540. Alternatively, the porous filter 230 can be provided as a replaceable unit that can be inserted into the filter can 540 during the service procedure. The embodiment of the invention shown in FIG. 9 is exemplary, as one skilled in the art will appreciate the variety of alternative methods of attaching the filter can 540 into an exhaust stream in such a way that it can be removed for maintenance and/or replacement. For example, cam-lock levers, threaded fasteners, and spring clips can provide for removably securing the filter can 540 in the replaceable filter housing 540. Further, it may be necessary to provide requisite gaskets and sealing members to provide for a gas-tight fit to ensure that exhaust gas does not leak during operation.

There may be situations during the operation of the two-stroke engine having an exhaust filter described herein, that accumulated particulate matter will detract from the performance of the engine. If backpressure becomes excessive, power output will be reduced, and a maximum, full throttle, engine speed will be reduced. To provide an indication that service or replacement is needed, before performance is significantly impacted, a backpressure sensor can be provided. In an embodiment, a pressure switch is installed upstream from the filter 230 in the exhaust stream. When the pressure in the exhaust stream detected by the pressure switch exceeds a predetermined threshold, an indicator light in the control panel for the two-stroke engine, such as in the dashboard of the personal transportation vehicle 100, to indicate to the operator that service of the filter 230 is necessary. Alternatively, a pressure gauge can be coupled to the exhaust stream upstream from the filter 230 to provide an analog indication of peak pressure values that can be discerned by an operator as an indication for service.

The porous ceramic filter consisting essentially of bonded ceramic fibers as herein described can be fabricated in a number of methods to produce a filter suitable for use in the present invention. Commonly assigned U.S. patent application Ser. No. 11/323,429, incorporated by reference herein, discloses exemplary methods of extrusion. Generally, a porous ceramic substrate consisting essentially of bonded ceramic fibers is fabricated by mixing ceramic fibers with additives comprising organic and inorganic binder materials, a pore former, and a liquid. The mixture is then formed into a substrate, and heated in various stages to remove the liquid constituents (drying), and remove organic additives and the pore former (binder burnout). A final sintering step is performed to promote bonding of the fibers as solid state ceramic bonds, or liquid state sintered bonds.

Figure 10:
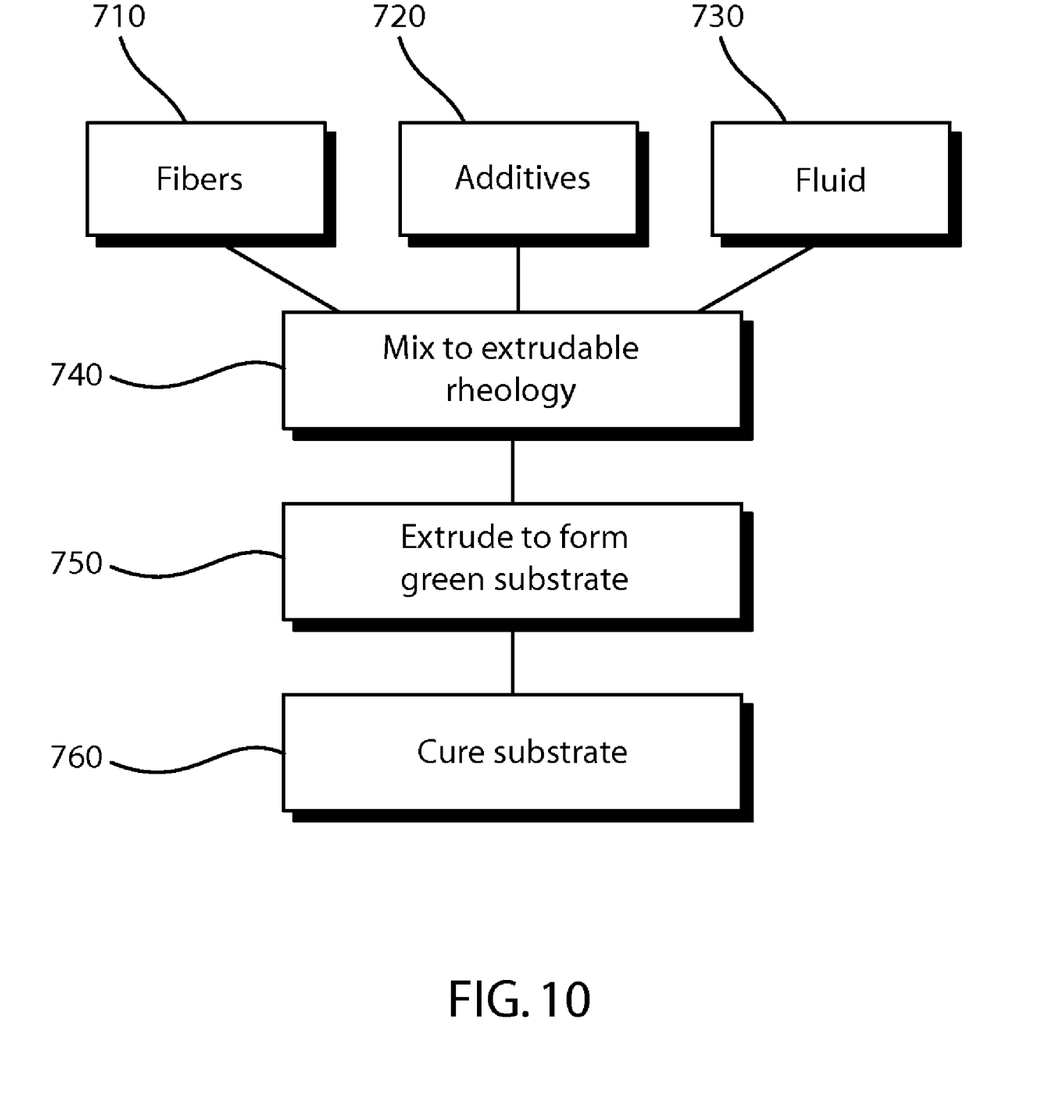
FIG. 10 shows a diagram of an exemplary process for fabricating the porous filter of the present invention.

The composition of the filter 230 is typically formed as a substantially fibrous fluid permeable monolithic block in a honeycomb form produced by extrusion, casting, broaching, or other fabrication processes. FIG. 10 shows a flowchart for an illustrative process of fabrication of a porous ceramic filter consisting essentially of bonded ceramic fibers to produce a filter that can be used with the present invention.

Referring to FIG. 10, the filter fabrication process 700 begins with the combination of fibers 710, additives 720, and a fluid 730. The fibers are selected to be compatible with the exhaust stream of a gasoline two-stroke engine, which requires a material that is stable in the presence of combustion byproducts at an elevated operating temperature. In an illustrative embodiment, fibers composed of blends of alumina and silica have been used, including AZS (alumina zirconia silica) fibers or mullite fibers. Mullite fiber is a compatible fiber due to its exceptional high temperature properties, such as high resistance to thermal shock and thermal stress distribution arising from its low coefficient of thermal expansions, good strength and interlocking grain structure. Mullite is also characterized by relatively low thermal conductivity and high wear resistance. These properties do not suffer much at elevated temperatures, allowing the porous substrate to remain useable at high temperatures. Mullite is the mineralogical name given to the only chemically stable intermediate phase in the $SiO_2$—$Al_2O_3$ system. The natural mineral is rare, though found on the Isle of Mull off the west coast of Scotland. Mullite is commonly denoted as $3Al_2O_3.2\ SiO_2$ (i.e., 60 mol % $Al_2O_3$ and 40 mol % $SiO_2$). However, this is misleading since mullite is actually a solid solution with the equilibrium composition limits of between about 60 and 63 mol % alumina below 1600 degrees Celsius.

Figure 11:
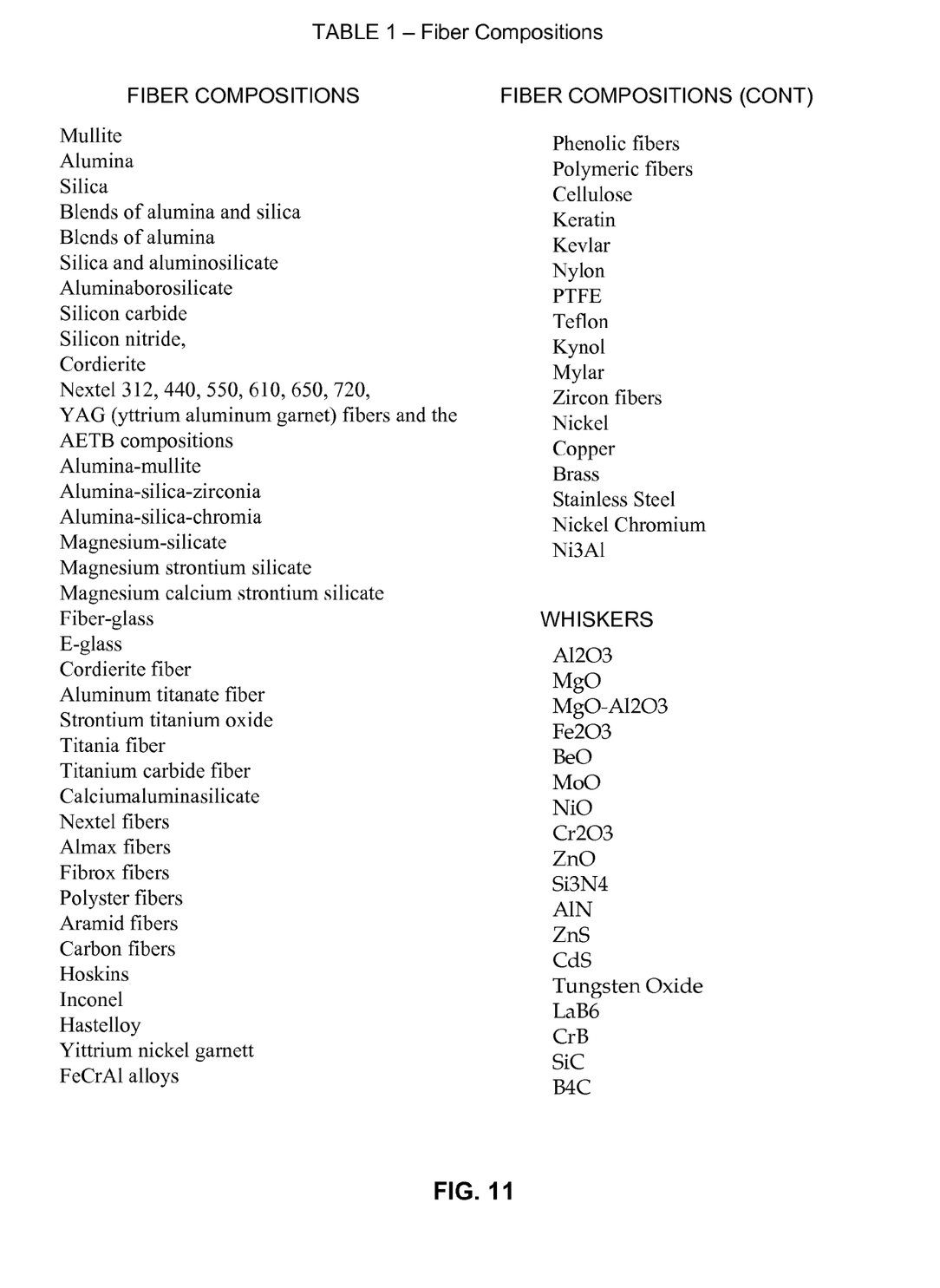
FIG. 11 lists tables of fibers, binders, pore formers, fluids, and rheologies useful with the present invention.

FIG. 11, Table 1 lists several types of fibers that may be used to form an extruded porous fibrous substrate for use in an exhaust filter for a two-stroke engine. Generally, the fibers may be ceramic, glass, or they may be metallic. For ceramic materials, the fibers may be in different states, such as amorphous, vitrous, poly-crystalline or mono-crystalline. Although Table 1 of FIG. 11 illustrates many available fibers, it will be appreciated that other types of fibers may be used.

Additives 720 include binders to provide elasticity to aid in attaining desired rheological properties, for mixing and formation of the porous filter by plasticizing the fiber, as well as to maintain a green strength before binder burnout. The binder also facilitates fiber-to-fiber bonds by forming glass bonds, ceramic bonds, amorphous bonds and crystalline bonds, and/or mechanical bonds during sintering. Binders can include organic materials, and inorganic materials, as listed on Table 2 of FIG. 11. In the exemplary embodiment, organic binder material comprising hydroxypropyl methyl cellulose (HPMC) and inorganic binder material comprising bentonite and colloidal silica are selected. Additives 720 optionally include pore formers to provide and enhance the porosity and permeability of the porous filter, as listed on Table 3 of FIG. 11. The porous substrate may achieve 40% to 60% porosity without any pore former, as the inherent fibrous structure will include interconnected pores upon removal of the organic binder additives. To attain a porosity that exceeds 60%, for example, to attain a porosity between 60% and 90%, a pore former, such as graphite powder, can be selected.

Table 4 of FIG. 11 lists several types of fluid 730 that can be added to adjust the rheological properties of the mixture. Although it may be appreciated that water may be the most economical and often used fluid, alternative fluids may be equally effective.

The fibers 710, additives 720, and fluid 730 are mixed to an extrudable rheology at step 740. Typically, proper rheology results from the proper selection and mixing of fibers and additives, and the fluid amount is adjusted to meet the proper rheology. A proper rheology may be indicated, such as by one of two tests. The first test is a subjective, informal test where a bead of mixture is removed and formed between the fingers of a skilled extrusion operator. The operator is able to identify when the mixture properly slides between the fingers, indicating that the mixture is in a proper condition for extrusion. A second more objective test relies on measuring physical characteristics of the mixture. Generally, the mixture is formed into a cylinder, and a vertical and a shear force is applied. Measurements are taken and plotted according to a comparison of cohesion strength according to pressure. By measuring the mixture at various mixtures and levels of fluid, a rheology chart identifying rheology points may be created, such as that shown in Table 5 of FIG. 11. Additionally, several direct and indirect tests for measuring rheology and plasticity do exist, and it is appreciated that any number of them can be employed to check if the mixture has the right rheology for it to be extruded into the final shape of the product desired.

Once the proper rheology has been reached, the mixture is extruded through an extruder at step 750. The extruder may be a piston extruder, a screw extruder, or a double screw extruder. The extruding process may be highly automated, or may require human intervention. The mixture is extruded through a die having the desired cross sectional shape for the filter substrate, such as a cylindrical honeycomb. The die is selected to sufficiently form the green substrate. In this way, a stable green substrate is created that may be handled through the curing process, while maintaining its shape and fiber alignment.

At step 760, the green substrate is then cured. Curing generally requires the removal of free water to dry the green substrate. It is important to dry the green substrate in a controlled manner so as to not introduce cracks or other structural defects. The temperature may then be raised to burn off additives, such as organic binder and pore former. The temperature is controlled to assure the additives are burned off in a controlled manner. It will be appreciated that additive burnoff may require cycling of temperature through various timed cycles with varying levels of heat and various environment (such as recirculated or stagnant air). The additive may be fully burned off, or some binder material, such as inorganic binder materials, may remain to provide a degree of structural support at fiber intersection or nodes. The final stage of the curing step 760 is a high temperature sintering process where the temperature is raised sufficient to form fiber-to-fiber bonds, including glass bonds, ceramic bonds, amorphous bonds and crystalline bonds, and/or mechanical bonds. It will be appreciated that inorganic binder materials will react with the fibers to form bonds that result in high structural integrity of the porous filter.

The porous filter 230 of the exemplary embodiment can be fabricated as herein described according to the following ranges, though the stated features and characteristics are not to be interpreted as limiting, but rather as a representative basis for teaching one skilled in the art how to employ the present invention in virtually any two-stroke exhaust system:

| | |
|---|---|
| Form Factor | Honeycomb |
| Cell Density | 50-400 cells/sq. in (100-200 typical) |
| Cell Shape | Square, round, oval, pentagonal, Hepa or doughnut (hollow cylindrical) |
| Channel shape | Rectangular or hexagonal; Inlets can be larger than outlets to reduce backpressure generation and ash storage capacity |
| Wall Thickness | 10-40 mils (20-30 typical) |
| Porosity | 60% to 90% (75% to 85% typical) |
| Pore size | 5 to 100 microns (about 15-30 microns typical) |
| Pore formation | Pores are typically formed, dispersed, shaped and/or oriented by introducing volatile (typically organic) particulates (such as spheres, flakes, fibers, etc . . . ) during green body formation; these volatile pore-formers are burned off during curing and so leave voids of a predefined shape and size |
| Fiber orientation | For extruded bodies, the fibers are typically at least partially oriented parallel to the main axis of extrusion. Other processes, such as isostatic pressing, may result in bodies wherein the fibers are oriented completely randomly (anisotropic) or even perpendicular to bodies main axis |
| Primary component | Alumina-Silica Fibers, composition ranging from 1:19 to 19:1 alumina:silica, e.g., mullite fibers (typically from about 70% to about 95%) |
| Fiber diameter | Typically 2-10 micron, more typically between about 6 and about 10 microns; larger diameter tends to increase body strength and reduces health risks during processing |
| Aspect ratio | 5 to 1000 (5 to 30 typical); aspect ratio is an indicator of fiber packing density and thus affects ease of extrusion, filtration efficiency, thermo-mechanical strength, thermal expansion characteristics, and pore size |
| Additives | Ceramic particulate (typically from 0% to about 50%); typically selected to improve plasticity and extrudability, aid in fiber-to-fiber binding, and/or aid the sintering process; leads to thermomechanical strength |
| Mullite Whiskers | If added, from about 1% to 10%, typically to increase strength |
| Emissivity additives and coatings | Added to increases emissivity and heat reflectance of the body; leads to faster light-off, regeneration and low thermal absorption. |
| Glass, glass-ceramic, ceramic precursors | Added to tailor fiber-to-fiber bonding properties; can selectively toughen body by making failure mode less brittle at high temperatures |
| Primary product | Ø57.5 mm L 55.0 mm/Ø 63.0 mm L 80.0/Ø 63.0 mm L 40.0 (canned body size) 100 cells per square inch with 30 micron walls 200 cells per square inch with 20 micron walls 200 cells per square inch with 15 micron walls |
| Soot loading | Less than 5 grams per liter (typical) when continuously regenerating. |
| Light-off | In HC oxidation reaction, T95 (temperature to reach 95% conversion efficiency) was about 400 degrees Fahrenheit while comparable cordierite 400 cpsi was 700 degrees Fahrenheit. |
| Filtration efficiency | Typically >97%; some embodiments with >50% filtration efficiency |
| Operating temp | Efficient operation at temperatures exceeding 1000 degrees Celsius; typically safely to over 1300 degrees Celsius; more typically safely up to 1500 degrees Celsius |
| Thermal Mass | Very low to support fast light off and lower overall mass of filtration and catalytic conversion assembly |
| Chemical Reactivity | Relatively inert; non-reactive with gasoline two-stroke internal combustion engine exhaust gas or condensates, ash constituents (such as metal oxides or base-metal oxides), acids (except for very strong acids), alkalis, organics, salts, inorganic sols |
| Catalyst adherence | Easily coated by washcoat (e.g. gamma-alumina, ceria, tin oxide, titanium oxide) materials as well as traditional catalysts (e.g. platinum, palladium, rhodium, perovskites, base-metal oxides, lanthanates, |

-continued vanadium or tungsten oxides) using slurry or aqueous solution based processes; can easily be coated with zeolites, inorganic and organic membranes, algae, enzymes, bio-reactor catalysts, reagents While the invention has been illustrated and described in detail and with reference to specific embodiments thereof, it will be apparent to those skilled in the art that various changes and modifications can be made therein without departing from the spirit and scope of thereof. Thus, it is intended that the present invention cover the modifications and variations of this invention provided they come within the scope of the appended claims and their equivalents.

What is claimed is:

1. An exhaust filtration system comprising:
a gasoline two-stroke engine having an exhaust outlet;
a filter housing coupled to the exhaust outlet;
a porous ceramic filter within the housing, the filter consisting essentially of an extruded wall-flow substrate of bonded ceramic fibers having a fiber aspect ratio between 5 and 1000 and a fiber diameter of between 2 and 10 microns, the substrate formed as a monolithic block in a honeycomb form and defining a plurality of channels separated by a wall comprising the bonded ceramic fibers; and
wherein the plurality of channels are alternatively plugged to provide an inlet channel and an outlet channel, so that exhaust gas passes from the inlet channel, through the wall, to the outlet channel.

2. The filtration system according to claim 1 further comprising a catalyst deposited on the ceramic fibers.

3. The filtration system according to claim 1 further comprising a catalyst deposited on the bonded ceramic fibers.

4. The filtration system according to claim 1 wherein the porous ceramic filter has a porosity between 60% and 90%.

5. The filtration system according to claim 1 further comprising a catalyst deposited on the ceramic fibers.

6. The filtration system according to claim 5 further comprising air injection into the filter housing to provide oxygen for catalytic reduction of exhaust gas.

7. The filtration system according claim 1 wherein the extruded honeycomb wall-flow substrate has a cell density between 20 and 300 cells per square inch.

8. The filtration system according to claim 1 wherein the gasoline two-stroke engine further comprises a direct injection fuel injection system.

9. The filtration system according to claim 1 wherein the gasoline two-stroke engine further comprises a carburetor.

10. The filtration system according to claim 1 further comprising exhaust gas recirculation (EGR).

11. An exhaust filter comprising:
a housing having an inlet adapted to receive an exhaust stream comprising gaseous and particulate byproducts of combustion of a fuel and lubricant mixture;
a porous ceramic filter positioned within the filter housing, the filter comprising an extruded wall-flow substrate substantially composed of bonded ceramic fibers having a fiber aspect ratio between 5 and 1000 and a fiber diameter of between 2 and 10 microns, the substrate formed as a monolithic block in a honeycomb form and defining a plurality of channels separated by a wall comprising the bonded ceramic fibers; and
a plurality of channels extending at least partially through the block to provide a path for the exhaust stream, wherein the gaseous byproducts pass through the porous ceramic filter, and particulate byproducts accumulate in the ceramic filter.

12. The exhaust filter according claim 11 further comprising a catalyst disposed within the filter wherein the gaseous byproducts are chemically altered.

13. The exhaust filter according to claim 11 further comprising a catalyst disposed within the filter wherein the particulate byproducts are chemically altered.

14. The exhaust filter according to claim 13 wherein the particulate byproducts include soot.

15. The exhaust filter according to claim 13 wherein the particulate byproducts include ash.

16. The exhaust filter according to claim 13 wherein the particulate byproducts include lubricant oil.

17. The exhaust filter according to claim 11 further comprising a catalyst disposed within the filter wherein both the gaseous and particulate byproducts are chemically altered.

18. The exhaust filter according to claim 11 wherein the filter housing is adapted to permit removal of the porous ceramic filter.

19. The exhaust filter according to claim 18 further comprising an indicator that detects excessive backpressure to indicate a service requirement.

20. The exhaust filter according to claim 19 wherein the indicator comprises a pressure switch.

21. An exhaust filtration system comprising:
a gasoline two-stroke engine having an exhaust outlet;
a filter housing coupled to the exhaust outlet; and
an porous filter comprising an extruded wall-flow substrate consisting essentially of bonded metallic fibers having a fiber aspect ratio between 5 and 1000 and a fiber diameter of between 2 and 10 microns, the substrate formed as a monolithic block in a honeycomb form and defining a plurality of channels separated by a wall comprising the bonded metallic fibers; and
a plurality of channels extending at least partially through the block to provide a path for the exhaust stream, wherein the gaseous byproducts pass through the porous filter, and particulate byproducts accumulate in the filter.

22. A method for removing pollutants from the exhaust stream of a gasoline two-stroke engine comprising:
connecting to an exhaust outlet of the engine a porous ceramic filter consisting essentially of an extruded wall-flow substrate of bonded ceramic fibers having a fiber aspect ratio between 5 and 1000 and a fiber diameter of between 2 and 10 microns, the substrate formed as a monolithic block in a honeycomb form and defining a plurality of channels separated by a wall comprising the bonded ceramic fibers, the channels being alternatively plugged to provide an inlet channel and an outlet channel;
directing the exhaust stream through the substrate so that the exhaust stream passes through each wall from each inlet channel to each outlet channel;
catalyzing the conversion of hydrocarbon constituents of the exhaust stream into carbon dioxide and water;
catalyzing the conversion of carbon monoxide constituents of the exhaust stream into carbon dioxide; and
extracting particulate matter from the exhaust stream, the extracted particulate matter being stored within the ceramic fibers.

23. The method according to claim 22 further comprising catalyzing the conversion of nitrogen oxide constituents of the exhaust stream into nitrogen gas.

24. The method according to claim 22 wherein the particulate matter comprises soot, and further comprising catalyzing the reduction of soot into carbon dioxide and water.

25. An exhaust filter for a gasoline two-stroke engine comprising:
- a filter housing having an inlet for receiving an exhaust stream from the two-stroke engine;
- an extruded honeycomb ceramic substrate consisting essentially of bonded ceramic fibers having a fiber aspect ratio between 5 and 1000 and a fiber diameter of between 2 and 10 microns, the substrate formed as a monolithic block in a wall-flow configuration positioned within the filter housing, and the substrate defining a plurality of channels separated by a wall comprising the bonded ceramic fibers alternatively plugged to provide an inlet channel and an outlet channel, the exhaust stream directed into the substrate so that exhaust gas passes from the inlet channel, through the wall, to the outlet channel;
- the substrate having a porosity between 60% and 90%; and
- a catalyst disposed within the substrate.

26. The exhaust filter according to claim 25 wherein the catalyst operates to catalyze the reduction of particulate pollutants in the exhaust stream.

27. The exhaust filter according to claim 25 wherein the catalyst operates to catalyze the reduction of gaseous pollutants in the exhaust stream.

28. The exhaust filter according to claim 1 wherein the substrate has a porosity between 60% and 90%.

29. The exhaust filter according to claim 1 wherein the ceramic fibers comprise at least one of alumina-silica and mullite.

30. The exhaust filter according to claim 11 wherein the extruded honeycomb wall-flow substrate has a cell density between 20 and 300 cells per square inch.

31. The exhaust filter according to claim 25 wherein the extruded honeycomb wall-flow substrate has a cell density between 20 and 300 cells per square inch.

32. The exhaust filter according to claim 25 wherein the ceramic fibers comprise at least one of alumina-silica and mullite.

* * * * *